(12) United States Patent
Yu et al.

(10) Patent No.: US 7,990,077 B2
(45) Date of Patent: Aug. 2, 2011

(54) LED CONTROL CIRCUIT

(75) Inventors: Hung-Wei Yu, Tu-Cheng (TW);
Hsin-Wei Chen, Tu-Cheng (TW)

(73) Assignee: Cheng Uei Precision Industry Co., Ltd., Tu-Cheng, Taipei Hsien (TW)

( * ) Notice: Subject to any disclaimer, the term of this patent is extended or adjusted under 35 U.S.C. 154(b) by 343 days.

(21) Appl. No.: 12/333,922

(22) Filed: Dec. 12, 2008

(65) Prior Publication Data

US 2010/0148701 A1 Jun. 17, 2010

(51) Int. Cl.
*H05B 37/02* (2006.01)
(52) U.S. Cl. ......... 315/308; 315/224; 315/297; 315/309
(58) Field of Classification Search ............... 315/185 R, 315/209 R, 224–226, 291, 294, 297, 307–309
See application file for complete search history.

(56) References Cited

U.S. PATENT DOCUMENTS

| | | | |
|---|---|---|---|
| 5,736,881 A * | 4/1998 | Ortiz | 327/175 |
| 7,486,032 B2 * | 2/2009 | Lee | 315/291 |
| 2002/0130627 A1 * | 9/2002 | Morgan et al. | 315/291 |
| 2007/0040512 A1 * | 2/2007 | Jungwirth et al. | 315/159 |
| 2007/0109763 A1 * | 5/2007 | Wolf et al. | 362/86 |
| 2007/0109782 A1 * | 5/2007 | Wolf et al. | 362/253 |
| 2008/0238340 A1 * | 10/2008 | Leung et al. | 315/297 |
| 2008/0309255 A1 * | 12/2008 | Myers et al. | 315/297 |
| 2010/0127634 A1 * | 5/2010 | Dowling et al. | 315/291 |
| 2010/0213853 A1 * | 8/2010 | Tobler et al. | 315/113 |

* cited by examiner

*Primary Examiner* — Douglas W Owens
*Assistant Examiner* — Tung X Le
(74) *Attorney, Agent, or Firm* — Muncy, Geissler, Olds & Lowe, PLLC

(57) ABSTRACT

A LED control circuit includes an LED array circuit and a control circuit. The LED array circuit has a plurality of parallel branches, each of which has a constant-current regulator, an LED and an FET connected together in series, wherein the constant-current regulator supplies a steady current to the corresponding LED and the FET can control the respective LED to be put out or lighted up. The control circuit includes a microprocessor and a temperature sensor. The temperature sensor is connected with the microprocessor and located near the LEDs of the LED array circuit for detecting the temperature of the LEDs and transmitting the temperature signals to the microprocessor. The microprocessor is connected with the FETs of the LED array circuit for controlling the corresponding FETs to be repeatedly on or off according to the temperature signals in order to regulate the temperature of the corresponding LEDs respectively.

3 Claims, 2 Drawing Sheets

LED CONTROL CIRCUIT

BACKGROUND OF THE INVENTION

1. Field of the Invention

The present invention generally relates to a control circuit, and more particularly to an LED control circuit.

2. The Related Art

At present, LEDs are widely used in many electronic products for showing a working state or having a lighting function. When the LED works for a long time, the temperature of the LED will be risen such that has an influence on the lightness of the LED. So an LED control circuit capable of regulating the temperature of the LED comes with the tide of fashion.

Referring to FIG. 2, a conventional LED control circuit 1' includes a reference voltage generator 100' for generating a reference voltage Vref1, a non-inversion amplification unit 200', a driving unit 300', an LED 400' and a forward voltage detector 500'. The forward voltage detector 500' detects a forward voltage Vf at an anode of the LED 400' and then supplies the forward voltage Vf to the non-inversion amplification unit 200'. The non-inversion amplification unit 200' performs a non-inversion amplification to a difference voltage between the reference voltage Vref1 and the forward voltage Vf with a preset gain. The driving unit 300' adjusts a supply voltage thereof according to the difference voltage from the non-inversion amplification unit 200' and then supplies the adjusted supply voltage to the LED 400' so as to regulate the temperature of the LED 400'. However, the foregoing LED control circuit 1' is so complicated that occupies a relatively larger space and is difficult to meet the demand for miniaturization of electronic products.

SUMMARY OF THE INVENTION

An object of the present invention is to provide an LED control circuit including an LED array circuit and a control circuit. The LED array circuit has a plurality of parallel branches, each of which has a constant-current regulator, an LED and an FET connected together in series, wherein the constant-current regulator supplies a steady current to the corresponding LED and the FET is capable of controlling the respective LED to be put out or lighted up. The control circuit includes a microprocessor and a temperature sensor. The temperature sensor is connected with the microprocessor and located near the LEDs of the LED array circuit for detecting the temperature of the LEDs and transmitting the temperature signals to the microprocessor. The microprocessor is connected with the FETs of the LED array circuit for controlling the corresponding FETs to be repeatedly on or off according to the temperature signals in order to regulate the temperature of the corresponding LEDs respectively.

As described above, the LED control circuit of the present invention regulates the temperature of the LEDs by way of the temperature sensor, the microprocessor and the corresponding FETs, instead of a reference voltage generator, a non-inversion amplification unit, a driving unit and a forward voltage detector of the related art. Therefore, the foregoing LED control circuit is relatively simpler and occupies a relatively smaller space so that can meet the demand for miniaturization of electronic products.

BRIEF DESCRIPTION OF THE DRAWINGS

The present invention will be apparent to those skilled in the art by reading the following description of a preferred embodiment thereof, with reference to the attached drawings, in which.

DETAILED DESCRIPTION OF THE PREFERRED EMBODIMENT

Figure 1:
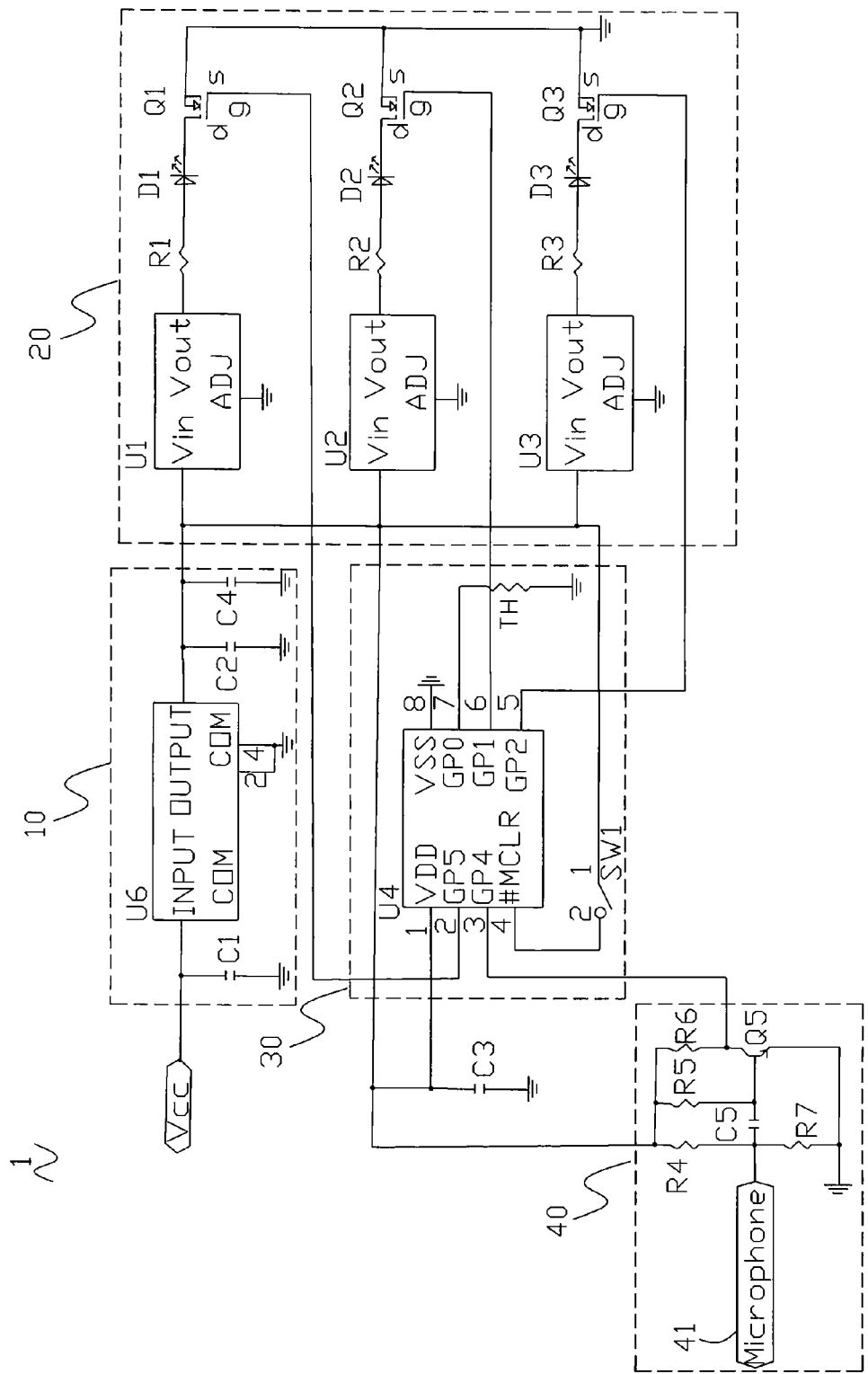
FIG. 1 is a circuitry of an LED control circuit according to the present invention.
Figure 2:
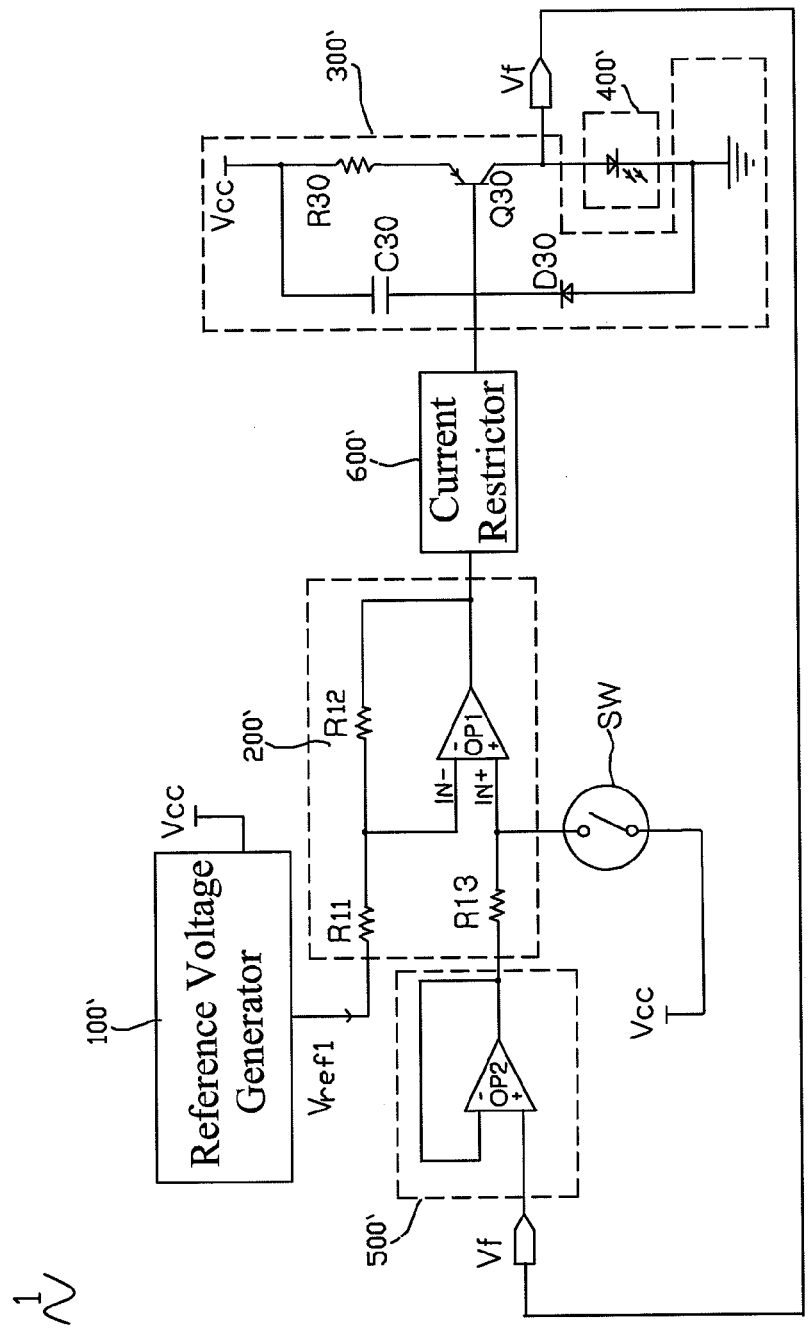
FIG. 2 is a circuitry of a conventional LED control circuit.

With reference to FIG. 1, an LED control circuit 1 according to the present invention includes a voltage-regulating circuit 10, an LED array circuit 20, a control circuit 30 and an audio-control circuit 40 connected with the voltage-regulating circuit 10 respectively.

The voltage-regulating circuit 10 includes a voltage regulator U6, a first filtering capacitor C1, a second filtering capacitor C2 and a third filtering capacitor C4. The voltage regulator U6 has an INPUT port connected to ground via the first filtering capacitor C1 and an OUTPUT port connected to ground via the second filtering capacitor C2 and the third filtering capacitor C4 respectively, wherein the second filtering capacitor C2 is parallel to the third filtering capacitor C4. The INPUT port of the voltage regulator U6 is further connected with a power supply Vcc, wherein the voltage from the power supply Vcc is regulated by the voltage regulator U6 and filtered by the filtering capacitors C1, C2, C4, and then is supplied to the LED array circuit 20, the control circuit 30 and the audio-control circuit 40 respectively. The voltage regulator U6 further has two COM ports respectively connected to ground.

The LED array circuit 20 has three parallel branches, wherein the first branch includes a first constant-current regulator U1, a red LED D1 and a first FET Q1 connected together in series; the second branch includes a second constant-current regulator U2, a green LED D2 and a second FET Q2 connected together in series; and the third branch includes a third constant-current regulator U3, a blue LED D3 and a third FET Q3 connected together in series. In this embodiment, the FETs Q1, Q2, Q3 are an N-channel FET respectively. Each of the constant-current regulators U1, U2, U3 has a Vin port connected with the OUTPUT port of the voltage regulator U6, a Vout port connected with the positive electrode of the respective LEDs D1, D2, D3, and an ADJ port connected to ground. The negative electrode of each of the LEDs D1, D2, D3 is connected with the drain of the respective FETs Q1, Q2, Q3. The source of each of the FETs Q1, Q2, Q3 is connected to ground. The constant-current regulators U1, U2, U3 can supply a relatively steady current to the corresponding LEDs D1, D2, D3 so as to make the red LED D1, the green LED D2 and the blue LED D3 generate red light, green light and blue light respectively.

The control circuit 30 has a microprocessor U4, a temperature sensor TH and a reset switch SW1 connected with the microprocessor U4 respectively. The microprocessor U4 has a VDD port connected with the OUTPUT port of the voltage regulator U6 and a VSS port connected to ground. A GP5 port of the microprocessor U4 is connected with the grid of the red LED Q1, a GP1 port is connected with the grid of the green LED Q2, and a GP2 port is connected with the grid of the blue LED Q3. The microprocessor U4 further has a MCLR port connected with the OUTPUT port of the voltage regulator U6 via the reset switch SW1, and a GP0 port connected to ground via the temperature sensor TH, wherein the reset switch SW1 can be operated to make the microprocessor U4 reset. The temperature sensor TH is located near the LEDs D1, D2, D3 for detecting the temperature from the LEDs D1, D2, D3 and then transmits temperature signals to the microprocessor U4. The microprocessor U4 judges the received temperature signals and then controls the corresponding FETs Q1, Q2, Q3 to be repeatedly on or off so as to further regulate the temperature of the corresponding LEDs D1, D2, D3. For example, when the microprocessor U4 monitors that the red LED D1 has a higher temperature according to the temperature signals from the temperature sensor TH, the microprocessor U4 transmits a series of square pulses to the GP5 port thereof so as to control the first FET Q1 to be repeatedly on or off that can lower down the temperature of the red LED D1 until a normal temperature from the LEDs D1, D2, D3 is detected by the temperature sensor TH.

The audio-control circuit 40 includes a microphone 41, an auxiliary capacitor C5, a NPN triode Q5, a first resistor R4, a second resistor R5, a third resistor R6 and a fourth resistor R7. The collector of the NPN triode Q5 is connected with a GP4 port of the microprocessor U4 on one hand, and on the other hand is connected with the OUTPUT port of the voltage regulator U6 via the third resistor R6. The base of the NPN triode Q5 is connected with the microphone 41 via the auxiliary capacitor C5 and the emitter is connected to ground. One terminal of the first resistor R4 is connected with the OUTPUT port of the voltage regulator U6, and the other terminal thereof is connected with the microphone 41. One terminal of the second resistor R5 is connected with the OUTPUT port of the voltage regulator U6, and the other terminal thereof is connected with the base of the NPN triode Q5. One terminal of the fourth resistor R7 is connected with the microphone 41, and the other terminal thereof is connected to ground. After an audio signal is collected by the microphone 41, the audio signal can be transmitted to the microprocessor U4 by way of the GP4 port so as to make the microprocessor U4 control the corresponding FETs Q1, Q2, Q3 to be off or on and further control the corresponding LEDs D1, D2, D3 to be put out or lighted up according to the standing of the audio signal. Therefore, when the microphone 41 receives the audio signal, many kinds of different color light can be generated due to a synthesis of any two kinds of light from the red light, the green light and the blue light generated by the red LED D1, the green LED D2 and the blue LED D3 respectively. In the embodiment, the standing of the audio signal is analyzed by the microprocessor U4 according to an instruction cycle of the program disposed in the microprocessor U4.

For example, if the instruction cycle is three seconds, when the standing of the audio signal is analyzed by the microprocessor U4 to be less than one second, the microprocessor U4 controls the first FET Q1 to be off so as to control the red LED D1 to be put out. At this time, the green LED D2 and the blue LED D3 keeps a lighted state, and the green light and the blue light generated by the green LED D2 and the blue LED D3 respectively are synthesized to a color light different from the green and blue light. When the standing of the audio signal is analyzed by the microprocessor U4 to be more than one second and less than two seconds, the microprocessor U4 controls the second FET Q2 to be off so as to control the green LED D2 to be put out. At this time, the red LED D1 and the blue LED D3 keeps a lighted state, and the red light and the blue light generated by the red LED D1 and the blue LED D3 respectively are synthesized to another color light different from the red and blue light. When the standing of the audio signal is analyzed by the microprocessor U4 to be more than two seconds, the microprocessor U4 controls the third FET Q3 to be off so as to control the blue LED D3 to be put out until the audio signal is broken off or next instruction cycle is started. At this time, the red LED D1 and the green LED D2 keeps a lighted state, and the red light and the green light generated by the red LED D1 and the green LED D2 respectively are synthesized to another color light different from the red and green light. The rest situations can be deduced by analogy.

As described above, the LED control circuit 1 of the present invention regulates the temperature of the LEDs D1, D2, D3 by way of the temperature sensor TH, the microprocessor U4 and the corresponding FETs Q1, Q2, Q3, instead of a reference voltage generator, a non-inversion amplification unit, a driving unit and a forward voltage detector of the related art. Therefore, the LED control circuit 1 of the present invention is relatively simpler and occupies a relatively smaller space so that can meet the demand for miniaturization of electronic products. Moreover, the foregoing LED control circuit 1 can generate many kinds of different color light according to the standing of the audio signal received by the audio-control circuit 40.

What is claimed is:

1. A LED control circuit, comprising:
   a LED array circuit having a plurality of parallel branches, each of the branches having a constant-current regulator, an LED and an FET connected together in series, wherein the constant-current regulator supplies a steady current to the corresponding LED and the FET is capable of controlling the respective LED to be put out or lighted up;
   a control circuit including a microprocessor and a temperature sensor, the temperature sensor being connected with the microprocessor for detecting the temperature of the LEDs and transmitting the temperature signals to the microprocessor, the microprocessor being connected with the FETs of the LED array circuit for controlling the corresponding FETs to be repeatedly on or off according to the temperature signals in order to regulate the temperature of the corresponding LEDs respectively; and
   an audio-control circuit connected with the microprocessor, the audio-control circuit receiving audio signals and transmitting the received audio signals to the microprocessor, the microprocessor controlling the corresponding FETs to be off or on so as to further control the corresponding LEDs to be put out or lighted up according to the standing of the audio signals.

2. The LED control circuit as claimed in claim 1, further comprising a voltage-regulating circuit connected with each constant-current regulator, the microprocessor and the audio-control circuit for supplying a working voltage to the LED array circuit, the control circuit and the audio-control circuit respectively.

3. The LED control circuit as claimed in claim 2, further comprising a reset switch connected between the microprocessor and the voltage-regulating circuit and capable of being operated to make the microprocessor reset.

* * * * *